2,789,097

BITUMINOUS EMULSIONS AND PROCESS FOR MAKING SAME

George W. Rappleyea, Southport, N. C.

No Drawing. Application December 17, 1952,
Serial No. 326,587

11 Claims. (Cl. 260—9)

This invention relates to new and improved bituminous emulsions. More specifically it relates to bitumen emulsions of improved stability which are not adversely affected by salts such as are found in salt water or hard water.

This application is made under the act of March 3, 1883 as amended by the act of April 30, 1928, and the invention herein described, if patented, may be manufactured by and for the Commandant of the United States Marine Corps and his successors in office or by or for other departments of the Government of the United States of America for governmental purposes without the payment to me of any royalty thereon.

Bituminous emulsions have hitherto generally been prepared with caustic soda and an emulsifying agent such as soaps or the like. Such emulsions possess a number of disadvantages. They are difficult to prepare, requiring careful formulation and regulation of conditions and the services of a skilled chemist. The pH of the mix must be maintained within certain narrow limits, generally about 6.6 to 6.8. An expensive colloid mill is generally required in order to break the bitumen particles down to a size sufficiently small to remain in dispersion.

The emulsions are relatively unstable and tend to break within a week or two. After separating, they can be reconstituted only by removing the bitumen and repeating the emulsification procedure from scratch, namely reheating the bitumen, reheating the separated water and passing both components through a colloid mill. This creates serious difficulties on the job where the necessary equipment, such as a colloid mill is rarely available. The emulsions must be made at an emulsifying plant where the know-how and equipment is available and shipped to the point of use. Because of the large quantities of water required in the emulsion, shipping for large distances is both very space-consuming and costly.

Another serious problem has been the sensitivity of the bituminous emulsions to electrolytes such as are present in hard water or salt water. Even a small amount of salt will cause the emulsion to break and hard water must be softened before it can be used as an emulsifying vehicle. As a result it has been impossible to use bituminous emulsions where there is any likelihood of contamination with salt—as for example, in stabilizing beach sands or beach paving without the costly preliminary of leaching the salt out of the sand.

Aqueous bituminous emulsions are slow setting. It frequently takes as long as 1 to 2 weeks for the water to evaporate sufficiently to permit the bitumen to set to the desired hardness. This is a serious disadvantage where rapid hardening is essential, as in the construction of military roads.

An object of this invention is to provide bituminous emulsions which are not adversely affected by salts, salt water or hard water and which, in fact, can be prepared with salt water or hard water as the vehicle.

Another object is to provide bituminous emulsions which can be prepared easily and without requiring the use of costly equipment.

Still another object is to prepare bituminous emulsions which are stable for considerable periods of time and which, should they separate, can be readily reconstituted by stirring or other means of agitation.

Another object is to provide bituminous emulsions which set to the desired hardness in a very short time.

Other objects and advantages of my invention will become obvious from the following detailed description.

I have discovered that by using waste sulfite liquor as an emulsifying vehicle, bituminous emulsions may be formed which are exceedingly stable and which are unaffected by salts such as those found in salt water or hard waters. Any of the common bitumens may be emulsified in this manner such as asphalt, coal tar and the like. The waste sulfite liquor is particularly effective for emulsifying the synthetic bitumen described in my copending application Ser. No. 276,695, filed March 14, 1952, which is a continuation-in-part of application Ser. No. 179,653, filed August 15, 1950, now abandoned. These bitumens are heat-polymerized products of an asphaltic fuel oil and dry solid carbohydrate materials such as powdered molasses, starches, wood sugars, hemicelluloses and dehydrated, powdered waste sulfite liquor. As disclosed in said copending application, a fuel oil having an asphalt content of about 10 to 60% is admixed with the dry carbohydrate material and a catalytic agent such as sulfur, sulfuric acid, lime, caustic soda or caustic potash, preferably sulfur, and heated until the asphaltic fuel oil and carbohydrate material are substantially polymerized to form a bitumenous mass which possesses excellent adhesive, waterproofing and stabilizing properties. The particular catalyst used determines to some extent the properties of the resulting bitumen. Sulfur, for example, produces a harder bitumen, with penetration points as low as 18 to 20, than do the alkaline catalysts.

The following is an illustrative example of the preparation of the heat-polymerized synthetic bitumen. An asphalt base fuel oil was heated to a temperature of about 220° F. and admixed with powdered blackstrap molasses, in an amount equivalent to about ½ lb. per gallon of fuel oil, and about ½% tall oil. The mixture was thoroughly agitated and cooled to about 122° F. About 5% powdered sulfur was added and thoroughly dispersed. The temperature was then raised gradually and with agitation to about 450–460° F. and this temperature maintained for about 30 minutes. The resulting bitumen had a penetration number of about 27.

In making the emulsion, the bitumen is softened by heating, the particular temperature being determined by the particular bitumen employed. Although this is not essential, it is desirable to heat the waste sulfite liquor concentrate to reduce its viscosity and to avoid cooling and congealing of the bitumen. The bitumen and waste sufite liquor are then mixed and agitated with any suitable equipment available, for example, by stirring, beating or the like. Where special equipment, such as a colloid mill, is not available, devices such as an outboard motor in a small tank are entirely adequate. The finer the breakdown of the bitumen particles, of course, the longer will the emulsion retain its stability. However, if the emulsion is to be employed within a fairly short time, can be satisfactorily prepared by manually stirring the mixture with a paddle.

The waste sulfite liquor, which is obtained from the digestion of wood by the sulfite process, should be concentrated to a solids concentration of about 40% to 60% by weight, and preferably about 50%. Lower concentrations do not produce satisfactory, stable emulsions. Higher concentrations may be used but the product is too stiff for most purposes and requires heating to render it sufficiently fluid for any use. If a somewhat more dilute emulsion is desired than is obtained with the lowest waste sulfite liquor concentration, water may be added after preparation of the bituminous emulsion without adversely affecting the stability.

The waste sulfite liquor may also be dehydrated to a solid powder, shipped to the place of use, dissolved in water to the desired concentration of solids and then mixed with the bitumen as aforedescribed to make the emulsion. This possesses the important advantages of markedly reducing shipping costs and permitting preparation of fresh emulsions as needed directly at the construction project or other place of use. The water employed as the emulsifying vehicle may be fresh water or brine. This is of importance since there are many places where fresh water is in very limited supply whereas sea water is present in abundance. Water of any degree of hardness may also be used.

The bituminous emulsions made with the waste sulfite liquor concentrates remain stable for periods as long as four weeks. In the event that they do separate, they can be reconstituted merely by stirring or agitating even after a considerable lapse of time. They can be employed for any use where a bituminous emulsion is desirable. They can also be employed where the presence of salts, such as sodium chloride, has made the use of bituminous emulsions impossible despite their desirability. In such cases it has been the practice to use either hot mixes or cutbacks despite such disadvantages as high cost, inflammability or fume toxicity. The heat polymerized asphaltic fuel oil-carbohydrate synthetic bitumen and waste sulfite liquor concentrate emulsions have been found to be particularly effective in stabilizing and paving beach sands despite high salt and moisture contents.

The amount of waste sulfite liquor concentrate employed in making the emulsions will vary with the particular bitumen. For relatively soft bitumens as, for example, coal tar, asphalt or heat polymerized asphaltic fuel oil-carbohydrate bitumen of relatively high penetration number smaller proportions of the waste sulfite liquor emulsifying vehicle may be used than in the case of the harder bituminous materials of low penetration point. The amount used will also vary to some extent depending upon the particular use to which the emulsion is to be put. In general, I have found that about 40% to 60% by weight of the waste sulfite liquor concentrate (40% to 60% solids) and preferably about 50%, gives an excellent, stable emulsion for most purposes. Where less than 40% of the emulsifier vehicle is used, the emulsion will not flow readily. In proportions higher than about 60%, the emulsion is not sufficiently stable. An optimum emulsion comprises substantially equal parts of a 50% solids concentrate of the waste sulfite liquor and bitumen.

*Example I*

Dehydrated, powdered waste sulfite liquor solids were diluted with an equal weight of fresh water. A heat-polymerized product of asphaltic fuel oil and dehydrated, powdered molasses was heated to its softening point, namely about 200° F. The aqueous waste sulfite liquor concentrate was heated and combined with an equal quantity of the synthetic bitumen with agitation. Heating of the waste sulfite liquor concentrate at no time exceeded the boiling point of water. An emulsion was produced which was stable for several weeks. After separation, the emulsion was readily reformed by stirring the mixture.

*Example II*

The procedure of Example I was followed except that sea water was substituted for the fresh water. An emulsion was obtained which was similar in all respects to the emulsion obtained in Example I.

As aforementioned, the bituminous emulsions may be employed wherever their use is desirable. They are particularly advantageous where salt, brine or hard water may be encountered because of their stability in such an environment, as for example, in stabilizing or paving beach sands.

An emulsion of the type described in Examples I and II, when mixed with sand, gravel or the like, requires about 7 to 11 days to set to the required hardness. Where time is not a critical factor, this delay is not serious. However, in many cases, the time factor is critical, as in making military access roads.

I have discovered that the addition of potassium bichromate to the emulsion just prior to use or, preferably, to the mineral aggregate such as clay, gravel, sand or the like reduces hardening time of the bitumen to as little as ½ to 1 hour. Other alkali metal bichromates, such as sodium bichromate are also very effective for my purpose but are somewhat slower than potassium bichromate in their accelerating effect. The reason for this phenomenon is not altogether clear but is apparently due to the fact that the bichromate exerts a gelling effect on the bitumen-waste sulfite liquor emulsion.

The bichromate may be added either in solid or solution form to the mineral aggregate, preferably prior to addition of the emulsion, although it may also be added subsequently. When added directly to the emulsion, the emulsion must be employed very quickly to avoid premature gelation. The amount of the bichromate salt used is not critical. As little as 1 to 3% of the bichromate, and preferably about 2% based on the total bituminous emulsion-mineral aggregate mix is entirely sufficient for most purposes. Somewhat higher proportions will accelerate hardening to some extent but for the most part the increased effect is negligible compared with the increased cost.

*Example III*

10 parts of an emulsion prepared according to Example I was mixed with 90 parts of beach sand to which 2 parts of potassium bichromate in aqueous solution had previously been added. A beach access road was paved with this mixture. Within 1 hour the road had hardened sufficiently to carry heavy truck traffic without cracking or other deterioration.

*Example IV*

36 parts of an emulsion prepared according to Example II was mixed with 50 parts of beach sand and 2 parts of potassium bichromate. 12 parts of scrap rubber was also added to this mix. Results were obtained which were similar to those of Example III.

Rate of hardening of the mixes containing the bichromate is influenced to some extent by conditions of humidity. When the atmosphere is dry, hardening takes place in as short a time as ½ hour. Under very humid conditions, hardening is somewhat slower but is accomplished in about 2 to 4 hours.

Although this invention has been described with reference to illustrative embodiments thereof, it will be apparent to those skilled in the art that it may be embodied in other forms but within the scope of the appended claims.

I claim:

1. A bituminous emulsion comprising a heat-polymerized synthetic bitumen product of an asphaltic fuel oil and a carbohydrate material dispersed in concentrated waste sulfite liquor, said emulsion being stable in the pressure of salt.

2. A bituminous emulsion comprising a heat-polymerized synthetic bitumen product of an asphaltic fuel oil and a carbohydrate material dispersed in an aqueous vehicle comprising water and about 40 to 60% waste sulfite liquor solids by weight, said emulsion being stable in the presence of salt.

3. A bituminous emulsion comprising about 60 to 40 parts by weight of a heat-polymerized synthetic bitumen product of asphaltic fuel oil and powdered molasses dispersed in about 40 to 60 parts by weight of an aqueous vehicle comprising water and about 40 to 60% waste sulfite liquor solids by weight, said emulsion being stable in the presence of salt.

4. A bituminous emulsion comprising about 50 parts by weight of a synthetic heat-polymerized synthetic bitumen product of asphaltic fuel oil and powdered molasses dispersed in about 50 parts by weight of an aqueous vehicle comprising water and about 50% waste sulfite liquor solids by weight, said emulsion being stable in the presence of salt.

5. A process for accelerating the setting and hardening of the bituminous emulsion of claim 1 which comprises incorporating an alkali metal bichromate into a mineral aggregate along with said bituminous emulsion.

6. A process for accelerating the setting and hardening of the bituminous emulsion of claim 1 which comprises incorporating potassium bichromate into a mineral aggregate along with said bituminous emulsion.

7. A paving composition comprising a mixture of a bituminous emulsion of claim 1, a mineral aggregate and an alkali metal bichromate.

8. A paving composition comprising a mixture of a bituminous emulsion of claim 1, a mineral aggregate and potassium bichromate.

9. A paving composition comprising a mixture of a bituminous emulsion of claim 3, a mineral aggregate and about 1 to 3% of potassium bichromate.

10. A process for accelerating the setting and hardening of the bituminous emulsion of claim 3 which comprises incorporating an alkali metal bichromate into a mineral aggregate along with said bituminous emulsion.

11. The process of claim 10 in which the alkali metal bichromate is potassium bichromate.

References Cited in the file of this patent

UNITED STATES PATENTS

| | | |
|---|---|---|
| 1,450,685 | Kirschbraun | Apr. 3, 1923 |
| 1,733,497 | Kirschbraun | Oct. 29, 1929 |
| 2,136,667 | Bert | Nov. 15, 1938 |
| 2,620,312 | Manzer | Dec. 2, 1952 |

OTHER REFERENCES

Sen: J. Sci. Tech., India, vol. 2, pages 8–24 (1936); Chem. Abstracts, vol. 32, page 1423 (1938).

Sen: Proc. Sug. Tech. Assoc., India, vol. 5, pages 289–302 (1936); Chem. Abstracts, vol. 32, pages 4302–4303.

Sen: J. Sci. Tech., India, vol. 3, pages 27–34 (1937); Chem. Abstracts, vol. 32, page 8735 (1938).

Sen. Proc. Sugar Tech. Assoc., India (1940), Pt. I, pages 315–325; Chem. Abstracts, vol. 35, pages 5667–5668 (1941).

Sen: J. Sci. Tech., India, vol. 4, pages 65–72 (1938); Chem. Abstracts, vol. 34, page 2562 (1940).

Srivastava: Indian Trade J., vol. 128, pages 734–735 (1938); Chem. Abstracts, vol. 32, page 4747 (1938.)